United States Patent
Jung et al.

(10) Patent No.: US 10,312,737 B2
(45) Date of Patent: Jun. 4, 2019

(54) WIRELESS POWER TRANSMISSION SYSTEM USING MULTIPLE COILS

(71) Applicant: LG ELECTRONICS INC., Seoul (KR)

(72) Inventors: Byungsang Jung, Seoul (KR); Seonghun Lee, Seoul (KR); Hwanyong Kim, Seoul (KR); Seonwook Park, Seoul (KR); Seungje Park, Seoul (KR); Yongjun Son, Seoul (KR); Jaesung Yang, Seoul (KR); Gyoocheol Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 15/460,567

(22) Filed: Mar. 16, 2017

(65) Prior Publication Data
US 2017/0279308 A1 Sep. 28, 2017

Related U.S. Application Data

(60) Provisional application No. 62/311,917, filed on Mar. 23, 2016.

(30) Foreign Application Priority Data

May 18, 2016 (KR) .......................... 10-2016-0060770

(51) Int. Cl.
| H01F 38/14 | (2006.01) |
| H02J 50/12 | (2016.01) |
| H05B 33/08 | (2006.01) |
| H05B 37/02 | (2006.01) |

(52) U.S. Cl.
CPC .............. *H02J 50/12* (2016.02); *H01F 38/14* (2013.01); *H05B 33/0809* (2013.01); *H05B 33/0842* (2013.01); *H05B 37/0272* (2013.01)

(58) Field of Classification Search
CPC ...... H02J 50/12; H01F 38/14; H05B 33/0809; H05B 37/0272; H05B 33/0842
See application file for complete search history.

(56) References Cited

U.S. PATENT DOCUMENTS

| 2006/0239043 A1* | 10/2006 | Ohbo | ................. H02M 3/3376 363/25 |
| 2012/0326523 A1 | 12/2012 | Fukushima | |

(Continued)

FOREIGN PATENT DOCUMENTS

WO  WO 2011/143059 A1  11/2011

*Primary Examiner* — Jared Fureman
*Assistant Examiner* — Duc M Pham
(74) *Attorney, Agent, or Firm* — Birch, Stewart, Kolasch & Birch, LLP

(57) ABSTRACT

A wireless power transmission system using multiple coils comprises a transmitter; and a receiver, wherein the transmitter includes a module for receiving a predetermined voltage, and a primary coil for generating a primary resonance frequency in accordance with the received voltage. The receiver spaced apart from the transmitter includes a load for emitting light, capacitors connected in series or in parallel in accordance with an equivalent resistance of the load, and a secondary coil for generating a secondary resonance frequency greater than the primary resonance frequency.

10 Claims, 18 Drawing Sheets

(56) References Cited

U.S. PATENT DOCUMENTS

2013/0337121 A1* 12/2013 Sugano .................. A23B 4/015
　　　　　　　　　　　　　　　　　　　　426/232
2015/0211783 A1　　7/2015 Marutani et al.
2015/0279554 A1* 10/2015 Ryoson .................... H01Q 7/06
　　　　　　　　　　　　　　　　　　　　343/788

* cited by examiner

| condition | (a) When equivalent resistance of load is small | (b) When structure of (a) and (c) cannot be used | (c) When equivalent resistance of load is great |
|---|---|---|---|
| structure change of receiver resonator | $Q = \dfrac{1}{R_L}\sqrt{\dfrac{C_S}{L_{lk2}}} \geq 2$ | $|i_{L_1}| > |0.2 \times i_2|$ (currently, $i_1 \approx 0.5 \times i_2$ level) | $Q = R_L\sqrt{\dfrac{C_p}{L_{lk2}}} \geq 2$ |
| |  |  |  |

WIRELESS POWER TRANSMISSION SYSTEM USING MULTIPLE COILS

CROSS REFERENCE TO RELATED APPLICATIONS

This application claims the benefit of earlier filing date and right of priority to U.S. Provisional Patent Application No. 62/311,917, filed on Mar. 23, 2016 and Korean Application No. 10-2016-0060770, filed on May 18, 2016, the contents of which are hereby incorporated by reference herein in their entirety.

BACKGROUND OF THE INVENTION

Field of the Invention

The present invention relates to a wireless power transmission system, and more particularly, to a wireless power transmission system provided on a rack of a refrigerator and applicable to a product that wirelessly supplies a power to a load (ex: LED).

Discussion of the Related Art

A wireless power transmission technology based on a magnetic flux has been recently discussed and its development has been discussed to be commercially used in the field of wireless charging of an electric car as well as a mobile device. Particularly, it is expected that such a wireless power transmission technology will be more useful in the field of requiring a detachable function, a waterproof function or a dustproof function. However, when a detachable device is detached, it is required to protect the device from excessive resonance energy. Moreover, after the detachable device is detached, when a metal foreign material approaches to the device, a problem occurs in that the metal foreign material is induction-heated. Therefore, it is required to solve this problem.

SUMMARY OF THE INVENTION

Accordingly, the present invention is directed to a wireless power transmission system that substantially obviates one or more problems due to limitations and disadvantages of the related art.

An object of the present invention is to provide a wireless power transmission system in which a problem that a metal foreign material is induction-heated when approaching to the system after a transmitter and a receiver of the system are detached from each other is solved using a secondary resonance point generated by the receiver.

Another object of the present invention is to provide a wireless power transmission system in which a problem predicted to occur when the system is provided on a rack of a refrigerator is solved.

Other object of the present invention is to provide a wireless power transmission system in which unnecessary circuits are maintained within a minimum range and at the same time heating predicted to occur due to a metal foreign material existing near the system is prevented from occurring.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a wireless power transmission system using multiple coils comprises a transmitter; and a receiver, wherein the transmitter includes a module for receiving a predetermined voltage, and a primary coil for generating a primary resonance frequency in accordance with the received voltage. The receiver spaced apart from the transmitter includes a load for emitting light, capacitors connected in series or in parallel in accordance with an equivalent resistance of the load, and a secondary coil for generating a secondary resonance frequency greater than the primary resonance frequency.

According to one embodiment of the present invention, it is advantageous that a problem of induction-heating of a metal foreign material when the metal foreign material approaches to the system after a transmitter and a receiver of the wireless power transmission system are detached from each other is solved using a secondary resonance point generated by the receiver.

According to another embodiment of the present invention, it is technically advantageous that a problem predicted to occur when the wireless power transmission system is provided on a rack of a refrigerator is solved.

According to other embodiment of the present invention, unnecessary circuits are maintained within a minimum range in the wireless power transmission system and at the same time heating predicted to occur due to a metal foreign material existing near the system is prevented from occurring.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Figure 1:
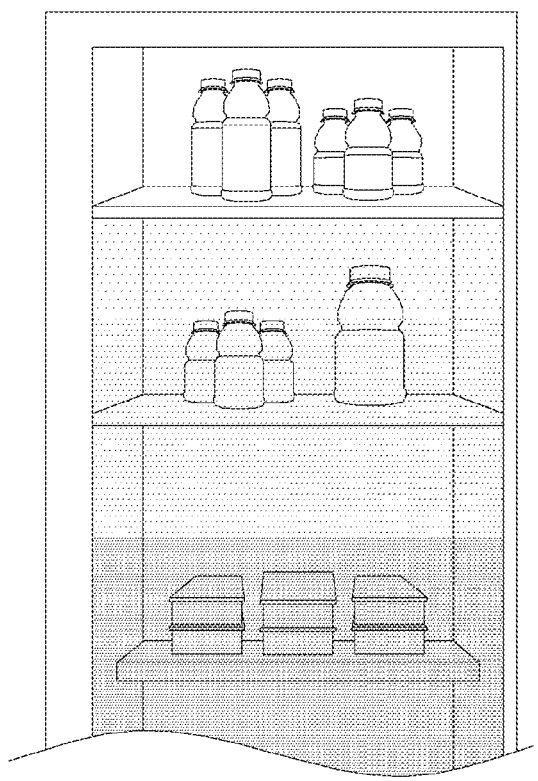
FIG. 1 illustrates an external appearance of refrigerator racks according to the related art.

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other.

Also, in description of the embodiments disclosed in this specification, if detailed description of the disclosure known in respect of the present invention is determined to make the subject matter of the embodiments disclosed in this specification obscure, the detailed description will be omitted.

Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" should be understood that no third element exists therebetween.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

A wireless power transmission system described in this specification is applicable to all devices that require wireless power transmission or charging. For example, the present invention may be applied to cellular phone, smart phone, notebook computer, wearable devices, HMD, signage, smart watch, smart glasses, TV, washing machine, cleaner, air-conditioner, etc. Although a refrigerator, especially refrigerator racks will mainly be described in this specification, the present invention is not limited to the refrigerator and its scope should be construed in accordance with the recitation cited in claims.

FIG. 1 illustrates an external appearance of refrigerator racks according to the related art.

Figure 2:
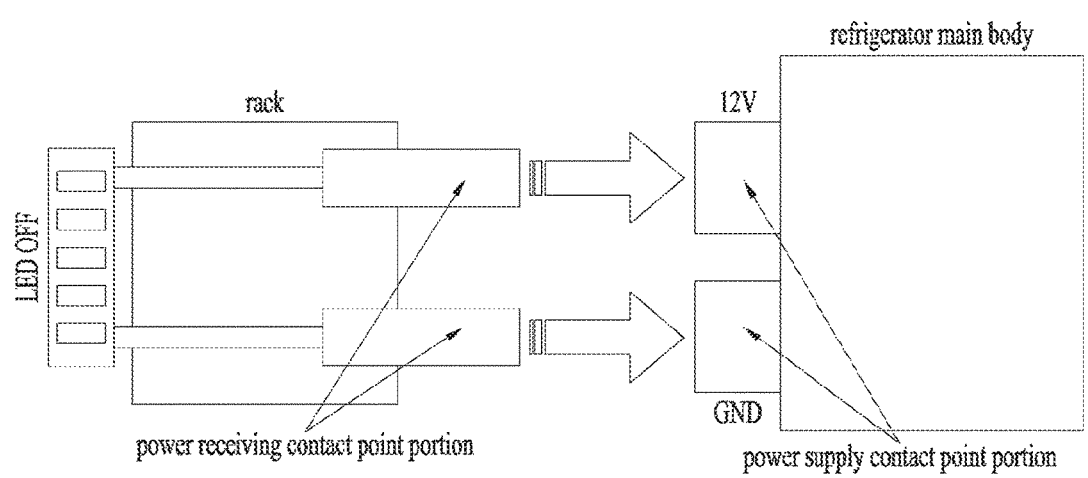
FIGS. 2 and 3 illustrate contact point type circuits of refrigerator racks according to the related art.
Figure 3:
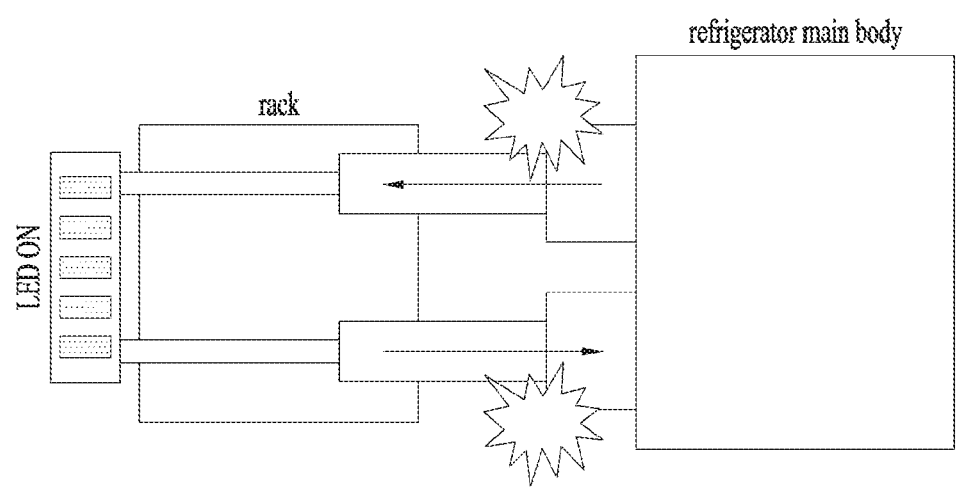

As shown in FIG. 1, the refrigerator racks according to the related art are provided with a lamp (ex: LED) installed on a top inside the refrigerator. Therefore, if much food is piled up on the refrigerator racks, a problem occurs in that light of the lamp does not reach the rack of the lowest end of the refrigerator. Meanwhile, in addition to the problem that one lamp is installed on the refrigerator rack according to the related art, if a lamp is installed on each rack by using a contact point circuit as shown in FIGS. 2 and 3, another problem occurs. Hereinafter, the contact point circuit will be described in detail with reference to FIGS. 2 and 3.

FIGS. 2 and 3 illustrate contact point type circuits of refrigerator racks according to the related art.

Basically, to facilitate washing of racks of a refrigerator, the racks are designed to be detached from a main body of the refrigerator.

As shown in FIG. 2, a power receiving contact point portion is arranged at one side of each rack and a power supply contact point portion is arranged at one side of the refrigerator main body. If the racks are spaced apart from the refrigerator main body as shown in FIG. 2, the LED of the rack is maintained at a turn-off state.

However, as shown in FIG. 3, if the racks are coupled with the refrigerator main body, a power source is supplied to the power receiving contact point portion through the power supply contact point portion of the refrigerator main body. As a result, the LED of the rack is changed to a turn-on state. In this way, if the refrigerator racks are designed as above, LED may be installed on each rack to enable on/off control.

However, if the LED of the rack is designed to be controlled in a contact point type shown in FIGS. 2 and 3, according to the investigation results, it is highly likely that the contact point portion of each of the racks and the refrigerator main body may be corroded or a mechanical contact defect may be caused because of a high humid condition of the refrigerator.

Moreover, the related art has a problem in that water leakage or electric shock may be likely to occur in the contact point portion due to careless maintenance of liquid (soup, etc.) kept in the refrigerator or during a coupling process of the rack after washing of the rack.

The present invention suggests a wireless power transmission system between a refrigerator main body and racks to solve the problems of the related art described in FIGS. 1 to 3, and further suggests a solution for solving a metal foreign material induction heating problem predicted to occur in the wireless power transmission system.

Figure 4:
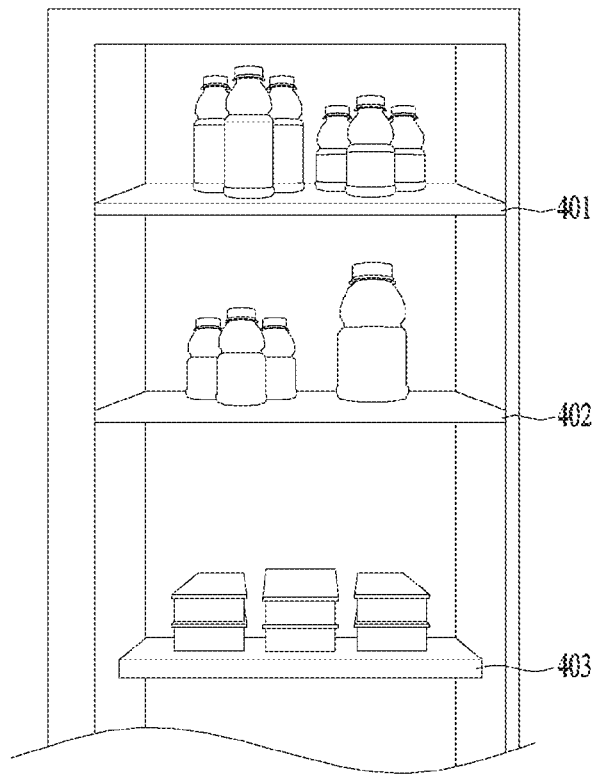
FIG. 4 illustrates an external appearance of refrigerator racks according to one embodiment of the present invention.

FIG. 4 illustrates an external appearance of refrigerator racks according to one embodiment of the present invention.

As shown in FIG. 4, the refrigerator according to one embodiment of the present invention includes three racks 401, 402 and 403, for example. The scope of the present invention is not limited to this example. Moreover, a lamp (for example, LED) is installed on each rack, whereby the problem caused by one lamp shown in FIG. 1 may be solved.

Moreover, to solve the problem (water leakage and electric shock especially in a humid refrigerator condition) of the LED of the contact point type rack according to the related art described with reference to FIGS. 2 and 3, the wireless power transmission system has been introduced in the present invention. The wireless power transmission system will be described in more detail with reference to FIG. 5 and following drawings.

Figure 5:
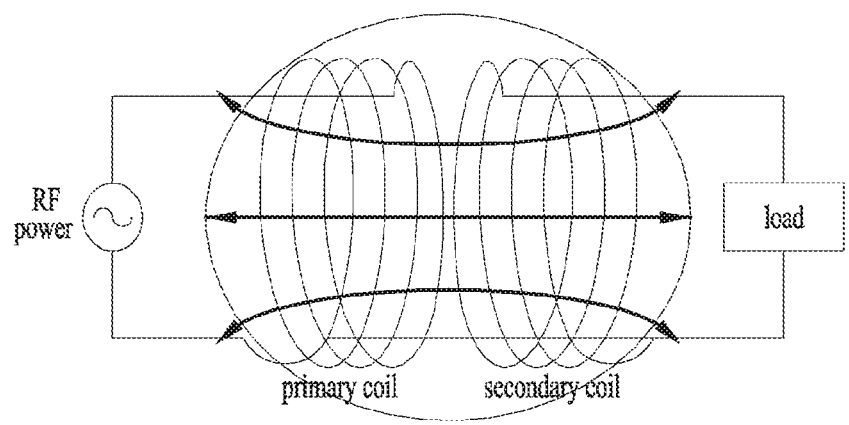
FIG. 5 briefly illustrates a circuit of a wireless power transmission system provided on a refrigerator rack according to one embodiment of the present invention.

FIG. 5 briefly illustrates a circuit of a wireless power transmission system provided on a refrigerator rack according to one embodiment of the present invention.

As shown in FIG. 5, the wireless power transmission system according to one embodiment of the present invention includes a circuit (installed on the rack of the refrigerator) comprised of a primary coil and a circuit (main body of the refrigerator) comprised of a secondary coil. The refrigerator rack is designed to be detached from the refrigerator main body so as not to cause any problem in washing.

If an alternating current (AC) current is applied to the primary coil shown in FIG. 5, magnetism is generated, and magnetism is induced to the secondary coil due to the generated magnetism, whereby a power is supplied to a load (ex: LED).

Figure 6:
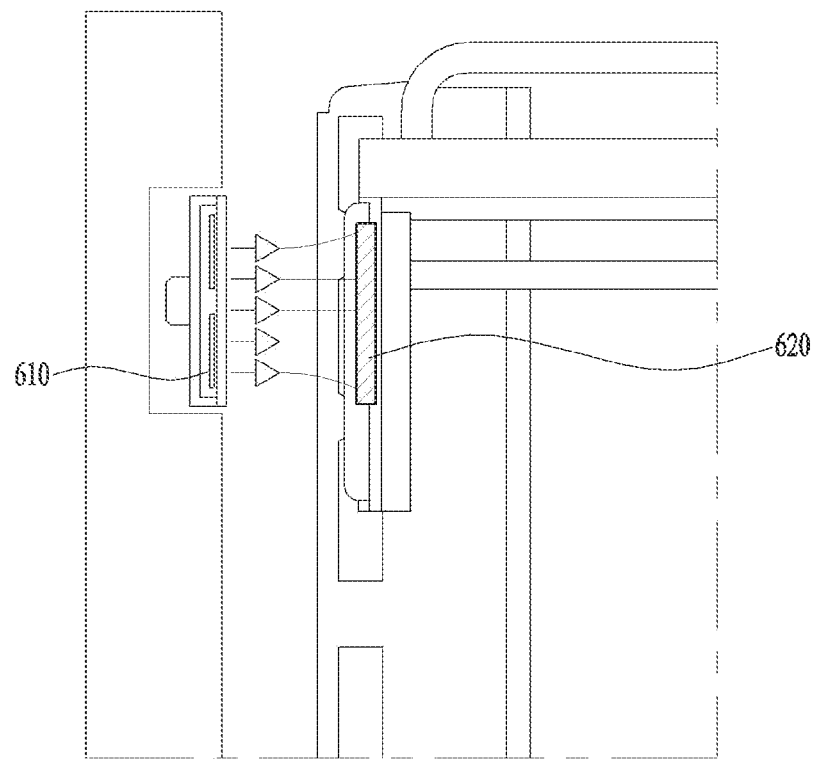
FIG. 6 illustrates a structure of a wireless power transmission system provided on a refrigerator rack according to one embodiment of the present invention.

FIG. 6 illustrates a structure of a wireless power transmission system provided on a refrigerator rack according to one embodiment of the present invention.

The circuit that includes the primary coil shown in FIG. 5 is installed in the refrigerator main body shown in FIG. 6, and may be referred to as a transmitter 610 of the wireless power transmission system. Meanwhile, the circuit that includes the secondary coil shown in FIG. 5 is installed in the rack of the refrigerator shown in FIG. 6, and may be referred to as a receiver 620 of the wireless power transmission system.

The transmitter 610 and the receiver 620 shown in FIG. 6 may be designed in a printed circuit board (PCB) coil structure for application of a small/thin type structure, for example. A power supplied to each rack installed in the refrigerator is 1.2 W, approximately, and a distance for power transfer, that is, a distance between the rack and the refrigerator main body is 6 mm to 10 mm, approximately. Of course, these numerical values are only exemplary, and it will be apparent that the scope of the present invention should be construed in accordance with the recitation cited in claims.

Moreover, for cost saving, another communication function has not been applied to the transmitter 610 and the receiver 620 shown in FIG. 6. Meanwhile, if a foreign object detection (FOD) function is excluded from the function of the transmitter and the receiver, technical effect of cost saving is obtained but an issue of heating when a metal foreign material approaches to the transmitter after the rack is detached from the transmitter is predicted to occur. To solve this problem, the present invention is characterized in that a secondary resonance frequency band is used. This will be described in detail with reference to FIG. 8 and following drawings.

The time required to supply a power to the transmitter 610 installed in the refrigerator main body is designed to be set to 7 minutes, approximately, from the time when a door of the refrigerator is opened. Of course, modifications and designs to another time value pertain to another scope of the present invention.

Figure 7:
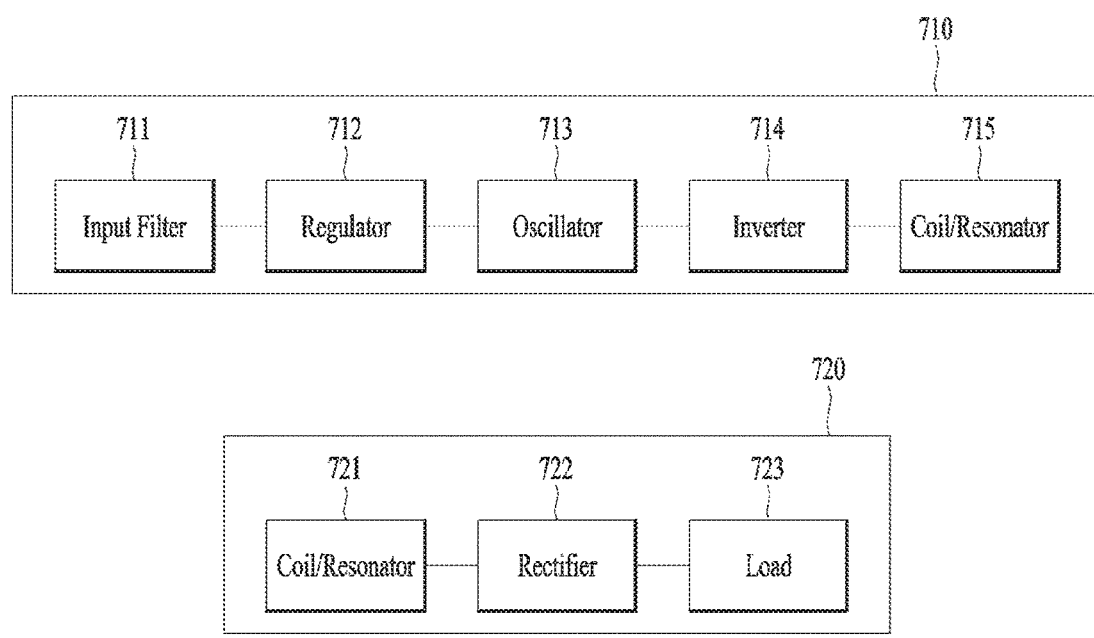
FIG. 7 more specifically illustrates a circuit of a wireless power transmission system provided on a refrigerator rack according to one embodiment of the present invention.

FIG. 7 more specifically illustrates a circuit of a wireless power transmission system provided on a refrigerator rack according to one embodiment of the present invention.

A transmitter 710 of the wireless power transmission system shown in FIG. 7 is installed in the refrigerator main body, and is spaced apart from a rack, which may be detached from the refrigerator main body, at a certain distance. The certain distance means a distance that generates secondary resonance by means of coils installed in the transmitter 710 and a receiver 720.

Moreover, as shown in FIG. 7, the transmitter 710 includes an input filter 711, a regulator 712, an oscillator 713, an inverter 714, and a coil/resonator 715. The circuit shown in FIG. 7 is a simple power transmission circuit, has no separate signal modulation/demodulation algorithm, and is configured in an operation/non-operation mode only in accordance with an input power of 12V, approximately. Also, the circuit shown in FIG. 7 is only exemplary, and the person with ordinary skill in the art may add, modify and delete some circuit within the scope of the present invention.

Meanwhile, the receiver 720 of the wireless power transmission system shown in FIG. 7 is installed on the rack of the refrigerator, and is spaced apart from the refrigerator main body at a certain distance. The certain distance means a distance that generates secondary resonance by means of coils installed in the transmitter 710 and the receiver 720. The secondary resonance will be described in detail with reference to FIG. 8 and following drawings.

Moreover, as shown in FIG. 7, the receiver 720 includes a coil/resonator 721, a rectifier 722, and a load 723. The load 723 corresponds to a light emitting diode (LED), for example. However, instead of the LED, any material for emitting light may be used as the load 723. Also, in the same manner as the transmitter 710, the receiver 720 does not need a separate signal modulation algorithm, and has a structure (or circuit) that transfers a power from the transmitter 710 to the load 723 of the receiver when a magnetic field is generated in the transmitter 710.

Figure 8:
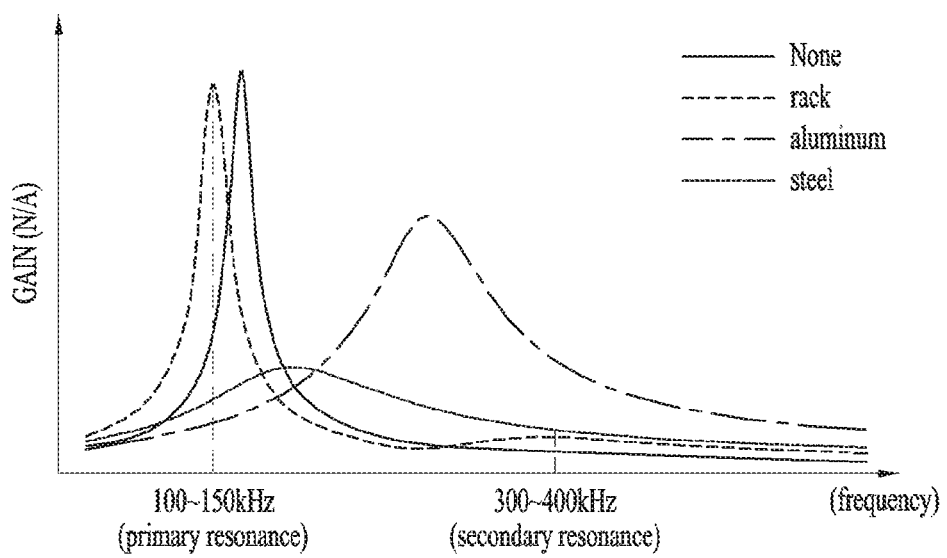
FIG. 8 illustrates a relation among primary resonance, secondary resonance and gain, which are acquired experimentally in accordance with one embodiment of the present invention.

FIG. 8 illustrates a relation among primary resonance, secondary resonance and gain, which are acquired experimentally in accordance with one embodiment of the present invention.

As described above, in implementing the wireless power transmission system according to one embodiment of the present invention, a communication function between the transmitter and the receiver is not applied to the wireless power transmission system, whereby a foreign object detection (FOD) function in the periphery (for example, refrigerator main body) of the transmitter is not applied thereto.

Therefore, it is required to set a secondary resonance frequency value for maximizing gain of secondary resonance (sub resonance) for efficient wireless power transmission and prevention of heating of metal foreign material. Meanwhile, gain of metal material due to secondary resonance frequency should be minimized.

If the transmitter and the receiver of the wireless power transmission system, which will be described later with reference to FIG. 10 and following drawings, are implemented, the results shown in FIG. 8 have been acquired experimentally.

First of all, if there is only the transmitter (refrigerator main body) and there is no receiver (refrigerator rack) as shown in FIG. 8, primary resonance is only generated in the range of 100 kHz to 150 kHz. Meanwhile, although the receiver (refrigerator rack) is not arranged on the transmitter (refrigerator main body), if a foreign material such as aluminum or steel approaches to the transmitter, resonance frequency exists at a bandwidth of 150 kHz to 250 kHz. However, if the receiver (refrigerator rack) is attached to the transmitter (refrigerator main body) at a certain distance, resonance departs from the resonance frequency range (150 kHz to 250 kHz) due to the foreign material, whereby a secondary resonance frequency (300 kHz to 400 kHz) is generated. Therefore, it is technically advantageous that wireless power transmission is performed and at the same time induction heating is not generated in the foreign material.

Figure 9:
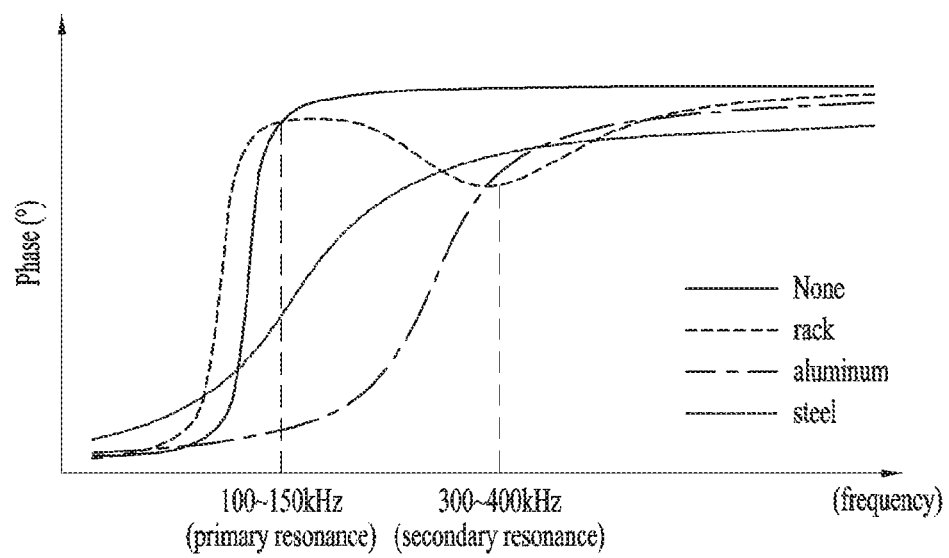
FIG. 9 illustrates a relation among primary resonance, secondary resonance and phase, which are acquired experimentally in accordance with one embodiment of the present invention.

FIG. 9 illustrates a relation among primary resonance, secondary resonance and phase, which are acquired experimentally in accordance with one embodiment of the present invention.

A frequency relation based on a gain value of the transmitter is shown in FIG. 8, whereas a frequency relation based on a phase value of the transmitter is shown in FIG. 9.

In the same manner as FIG. 8, it is noted from FIG. 9 that primary resonance and secondary resonance are generated in accordance with coupling (with a certain distance) between the transmitter and the receiver of the wireless power transmission system according to one embodiment of the present invention. Therefore, since the frequency (300 kHz to 400 kHz) of the secondary resonance is higher than the frequency (150 kHz to 250 kHz) corresponding to the case that the transmitter is coupled with the metal material, a technical effect that heating of the metal material may be avoided will be expected.

Meanwhile, if the secondary resonance frequency shown in FIGS. 8 and 9 is designed to be higher than the primary resonance frequency as much as twice, approximately, heating predicted to occur when the metal foreign material instead of the receiver (rack) approaches to the transmitter (refrigerator main body) may be avoided.

Moreover, details of FIGS. 8 and 9 will be described in short as follows.

If steel based metal is aligned on the transmitter (refrigerator main body), an induction current is generated in the steel in accordance with a current flowing in the coil of the transmitter, whereby the induction current is consumed as heat (induction heating). Therefore, resistance components are likely to be increased in view of impedance of the transmitter.

Also, if aluminum based metal is aligned on the transmitter, induction heating is not generated but a magnetic path of the coil is varied, whereby inductance of the coil is varied to vary the resonance frequency of the resonator of the transmitter. However, this metal material varies resonance property but does not generate additional resonance point (secondary resonance).

On the other hand, if the receiver (refrigerator rack) having additional resonance point is aligned on the transmitter, separate additional resonance point may be generated, and higher frequency of twice or more may be set in accordance with a magnetic coupling state of the transmitter and the receiver.

Figure 10:
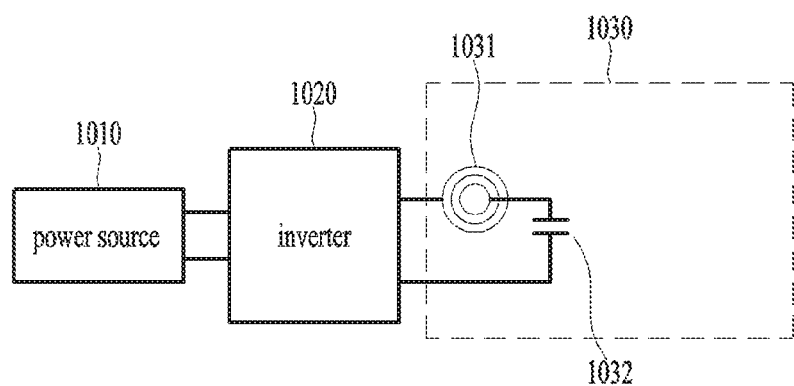
FIG. 10 briefly illustrates a structure of a transmitter of a wireless power transmission system according to one embodiment of the present invention.

FIG. 10 briefly illustrates a structure of a transmitter of a wireless power transmission system according to one embodiment of the present invention.

The transmitter of the wireless power transmission system according to one embodiment of the present invention includes a power source 1010, an inverter 1020, and a resonator 1030. The resonator 1030 includes a coil 1031 and a capacitor 1032. Of course, deletion, addition and modification of some modules pertain to another scope of the present invention.

As shown in FIG. 10, if the transmitter (refrigerator main body) that uses the resonator 1030 in which inductance of the coil 1031 and the capacitor 1032 are connected in series exists independently, a single resonance point is generated in the resonator 1032.

However, if a metal foreign material is arranged in the periphery of the coil 1031 of the transmitter shown in FIG. 10, resonance frequency and resonance quality factor are varied. Also, if the receiver (refrigerator rack) having a resonator, which uses inductance of the coil and the capacitor, is arranged similarly to the transmitter shown in FIG. 10, secondary resonance may be generated. A detailed structure of the receiver will be described in more detail with reference to FIG. 11.

Meanwhile, the wireless power transmission system based on multiple coils according to one embodiment of the present invention includes the transmitter shown in FIG. 10 and the receiver which will be described with reference to FIG. 11 and following drawings.

The transmitter includes a module 1010 for receiving a predetermined voltage and a primary coil 1031 for generating the primary resonance frequency in accordance with the received voltage. Moreover, according to one aspect of the present invention, the module 1010 is designed to include an inverter 1020 that converts a DC power to an AC power and supplies the converted AC power to the primary coil 1031. Also, the module 1010 is designed to control the inverter 1020 by using the secondary resonance frequency generated by the receiver. Furthermore, if the wireless power transmission system according to one embodiment of the present invention is designed in the refrigerator, the predetermined voltage is received in the module 1010 when door open of the refrigerator is sensed, while reception of the predetermined voltage is stopped when door close of the refrigerator is sensed. As a result, unnecessary power consumption may be avoided within another scope of the present invention.

Meanwhile, the receiver spaced apart from the transmitter includes a load for emitting light, capacitors connected in series or in parallel in accordance with an equivalent resistance of the load, and a secondary coil for generating the secondary resonance frequency greater than the primary resonance frequency. Hereinafter, the detailed structure of the receiver will be described with reference to FIG. 11.

Figure 11:
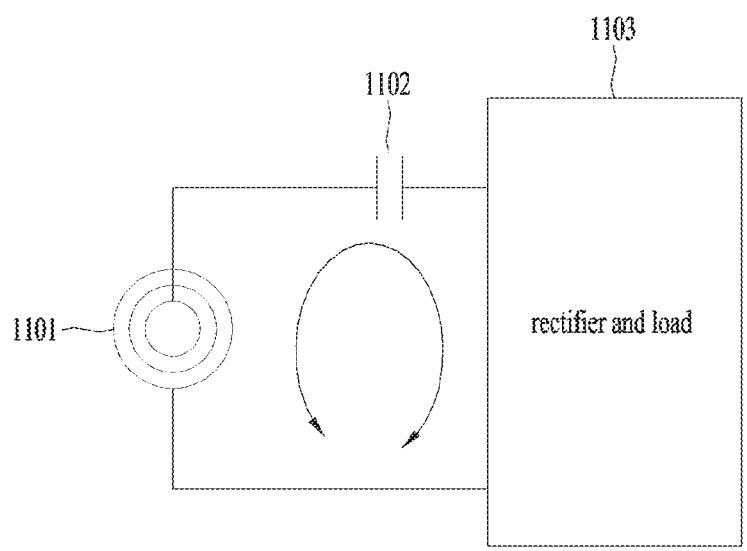
FIG. 11 illustrates an example of a structure of a receiver of a wireless power transmission system according to one embodiment of the present invention.
Figure 12:
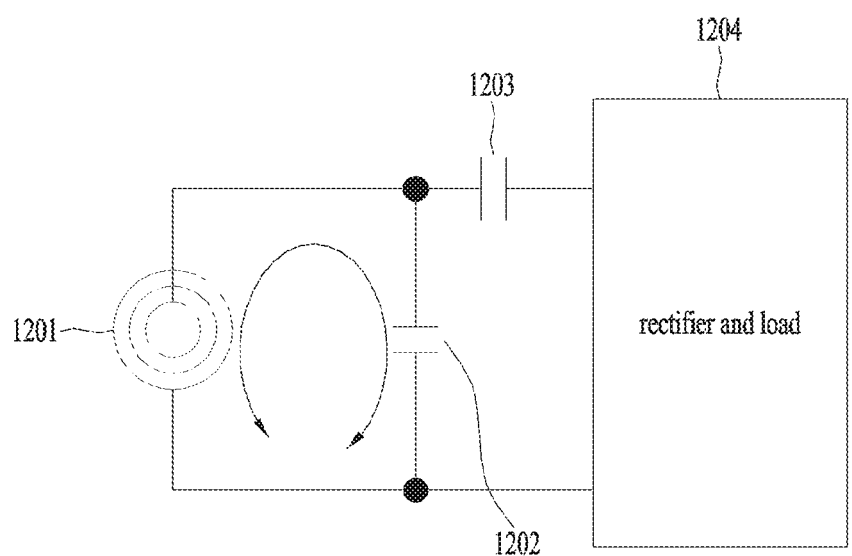
FIG. 12 illustrates another example of a structure of a receiver of a wireless power transmission system according to one embodiment of the present invention.
Figure 13:
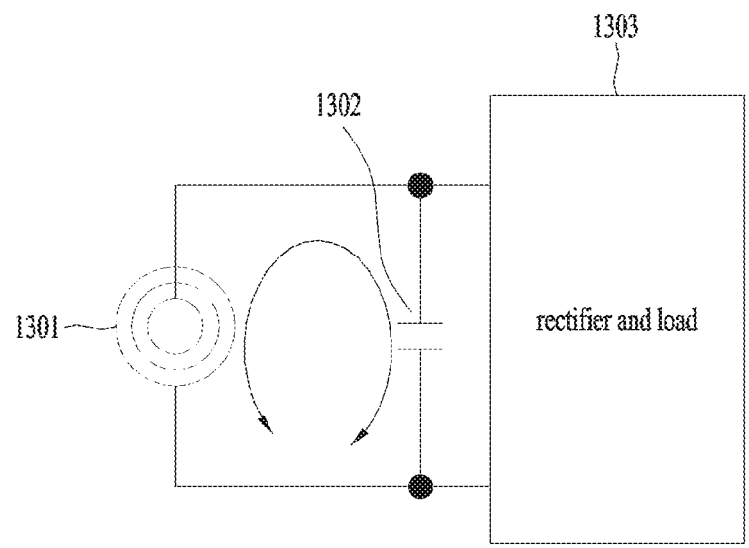
FIG. 13 illustrates other example of a structure of a receiver of a wireless power transmission system according to one embodiment of the present invention.

FIG. 11 illustrates an example of a structure of a receiver of a wireless power transmission system according to one embodiment of the present invention. FIG. 12 illustrates another example of a structure of a receiver of a wireless power transmission system according to one embodiment of the present invention. FIG. 13 illustrates other example of a structure of a receiver of a wireless power transmission system according to one embodiment of the present invention;

Each of the receivers shown in FIGS. 11, 12 and 13 has a structure per load that enables additional resonance point (secondary resonance).

According to another aspect of the present invention, the structure of the receiver is varied depending on a size of the load, and is designed such that a main current should be flow to the capacitor. Moreover, a high value and a low value of the equivalent resistance of the load are values applied relatively depending on a coupling state (for example, distance) of the transmitter and the receiver, and may be obtained experimentally.

As a result of data obtained experimentally, the frequency of the secondary resonance tends to be increased as coupling of the coils of the transmitter and the receiver is increased (that is, mutual inductance is increased), the size of the serial capacitors becomes smaller, and the size of the parallel capacitors becomes smaller.

When the equivalent resistance of the load (ex: LED) of the receiver (ex: refrigerator rack) is relatively small, as shown in FIG. 11, the coil 1101 and the rectifier/load 1103 of the receiver are connected with the capacitor 1102 in series.

Meanwhile, if the equivalent resistance of the load of the receiver has a range of a middle level, as shown in FIG. 12, a parallel capacitor 1202 and a serial capacitor 1203 exist between a coil 1201 and a rectifier/load 1204.

Finally, if the equivalent resistance of the load of the receiver is relatively great, as shown in FIG. 13, a coil 1301 and a rectifier/load 1303 of the receiver are connected with a capacitor 1302.

As a conclusion of FIGS. 11 to 13, if the equivalent resistance of the load of the receiver is less than a predetermined first threshold value, the coil and the capacitor of the receiver are connected with each other in series. If the equivalent resistance of the load of the receiver exceeds a predetermined second threshold value, the coil and the capacitor of the receiver are connected with each other in parallel. In this case, the second threshold value is greater than the first threshold value. Meanwhile, if the equivalent resistance of the load of the receiver is the first threshold value or more and the second threshold value or less, two capacitor are configured and are respectively connected with the coil of the receiver in series and in parallel. The coil of the transmitter may be referred to as the primary coil, and the coil of the receiver may be referred to as the secondary coil.

Figure 14:
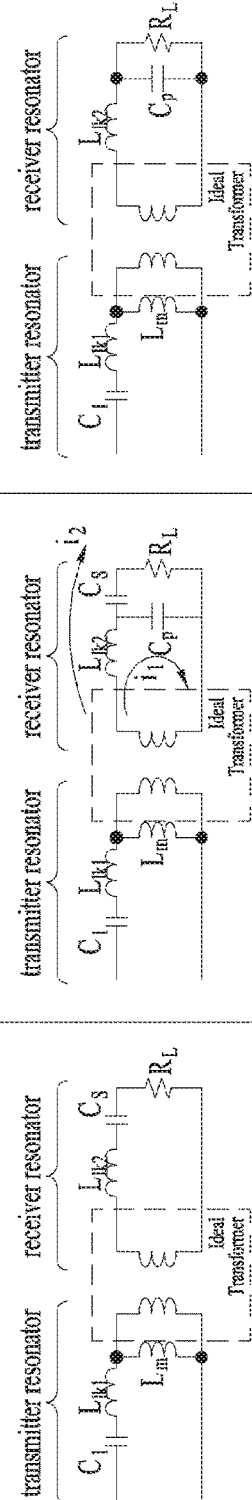
FIG. 14 illustrates a condition for a structure of each receiver shown in FIGS. 11 to 13.
Figure 14:
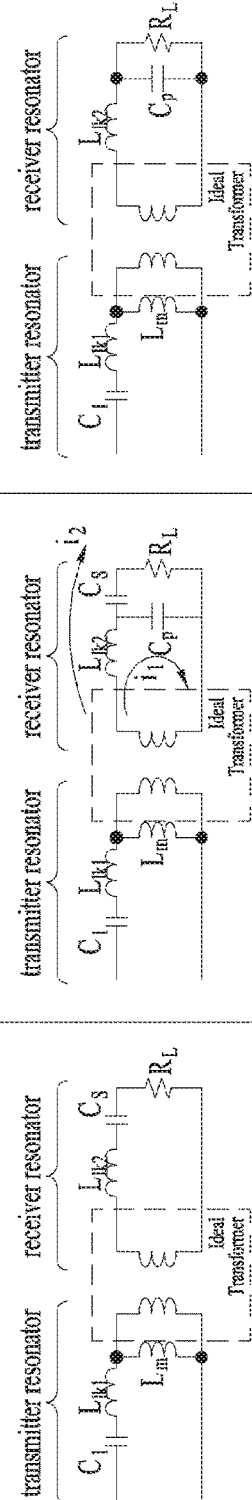
Figure 14:
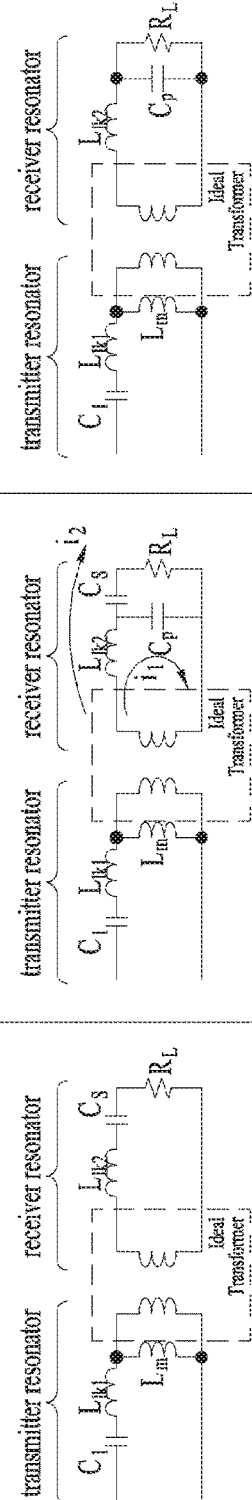

FIG. 14 illustrates a condition for a structure of each receiver shown in FIGS. 11 to 13. Particularly, FIG. 14 illustrates a detailed principle that secondary resonance is generated through resonator transformer modeling of each of the transmitter (refrigerator main body) and the receiver (refrigerator rack) of the wireless power transmission system.

According to this principle, a secondary resonance point generated by a separate inductor component L1k2 and capacitor (Cp/Cs) components of the resonator of the receiver is transferred due to mutual inductance Lm generated by coil coupling of each of the transmitter and the receiver and an ideal transformer having mutual inductance Lm in parallel.

Moreover, since Q (quality factor) which is an indicator for indicating resonance property of the resonator of the receiver should be great enough to indicate resonance property, the receiver should be designed as shown in FIG. 14 in accordance with the size of the equivalent resistance of the load (ex: LED) to obtain a technical effect having a property of the secondary resonance.

That is, the capacitors Cs are designed to be connected in series as shown in (a) of FIG. 14 when the equivalent resistance of the load of the receiver is relatively small, whereas the capacitors Cp are designed to be connected in parallel as shown in (c) of FIG. 14 when the equivalent resistance of the load of the receiver is relatively great.

Moreover, when the circuits shown in (a) and (c) of FIG. 14 cannot be used (that is, when the equivalent resistance of the load of the receiver belongs to a middle range), the serial capacitors Cs and the parallel capacitors Cp are all added to the resonator of the receiver to obtain sufficient secondary resonance property.

Meanwhile, although FIG. 14 illustrates that the circuit is varied depending on the equivalent resistance of the load of the receiver, serial/parallel capacitors may be designed to be connected with each other by only one circuit through a switch in accordance with the equivalent resistance of the load within another scope of the present invention.

Figure 15:
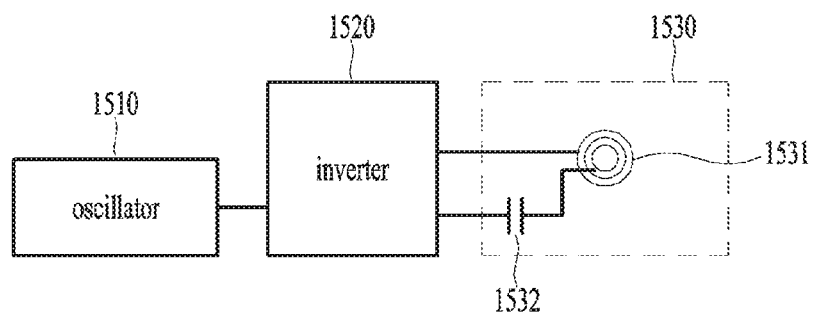
FIG. 15 illustrates an example of a structure of a transmitter shown in FIG. 10.

FIG. 15 illustrates an example of a structure of a transmitter shown in FIG. 10. Hereinafter, a principle for generating secondary resonance using a transmitter that uses fixed frequency will be described with reference to FIG. 15.

As shown in FIG. 15, the transmitter (refrigerator main body) includes an oscillator 1510, an inverter 1520, and a resonator 1530. The resonator 1530 includes a coil 1531 and a capacitor 1532.

As described above, when the transmitter (refrigerator main body) exists independently (state that no rack is attached to the transmitter), resonance frequency of the resonator of the transmitter is f1, and when the receiver is attached to the transmitter, additionally generated resonance frequency is f2. In this case, serial capacitors or parallel capacitors of the receiver are set at a corresponding distance (see FIG. 14) to obtain f2>2f1, and wireless power transmission may be performed through components of the transmitter shown in FIG. 15, 16 or 17.

If the transmitter is driven fixedly at a peripheral frequency of f2 which is additionally generated secondary resonance frequency, since f2 is far away from the resonance frequency f1 of the resonator of the transmitter, a very weak current flows in the resonator of the transmitter even though the transmitter exists independently or another metal material approaches to the transmitter.

Therefore, induction heating caused by the metal material is very low, and it is technically advantageous that sufficient energy transmission is performed due to property of secondary resonance when the receiver (rack) is aligned.

FIG. 15 illustrates an example of a structure of the transmitter that uses the above method. The oscillator 1510 has a frequency desired to be driven with a pulse type output, and the inverter 1520 converts a DC power to an AC power of a corresponding frequency component. Moreover, the AC power output from the inverter 1520 flows to the coil 1531 of the resonator 1530 of the transmitter, whereby magnetic coupling between the transmitter and the receiver is generated to transmit energy.

Figure 16:
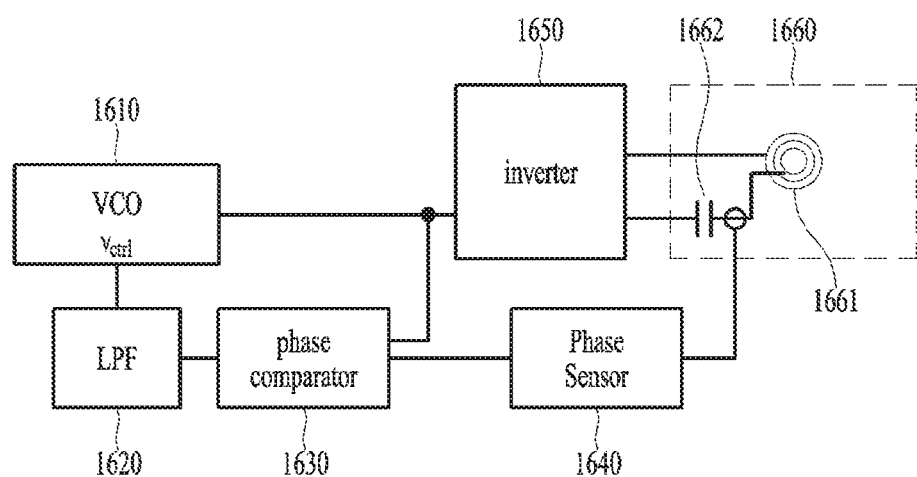
FIG. 16 illustrates another example of a structure of a transmitter shown in FIG. 10.

FIG. 16 illustrates another example of a structure of a transmitter shown in FIG. 10. Hereinafter, a principle for generating secondary resonance using a transmitter that senses phase will be described with reference to FIG. 16.

As shown in FIG. 16, the transmitter (refrigerator main body) includes a voltage controller oscillator (VCO) 1610, a low pass filter (LPF) 1620, a phase comparator 1630, a phase sensor 1640, an inverter 1650, and a resonator 1660. The resonator 1660 includes a coil 1661 and a capacitor 1662.

In FIG. 16, when the transmitter (main body of the refrigerator) and the receiver (rack) are aligned, an apparent phase difference change between current and voltage at the resonator 1660 of the transmitter is observed to sense the receiver (rack). In comparison with FIG. 15, the oscillator 1510 of FIG. 15 is changed to the voltage controller oscillator (VCO) in FIG. 16, and the phase sensor 1640 and the phase comparator 1630 for sensing a phase difference between rectification of the resonator 1660 and driving frequency of the inverter 1650 and the LPF 1620 for preventing oscillation of a feedback system from occurring are added to the structure of the transmitter in FIG. 16.

An operation algorithm of the transmitter is as follows.

First of all, the transmitter shown in FIG. 16 starts to be driven at a frequency higher than f2 (secondary resonance frequency), and searches for an operation point having a specific phase difference while lowering the frequency to reach f2.

If the operation point cannot be searched until the driving frequency reaches f2, it is determined that a foreign material (another metal not the rack) approaches to the transmitter or the receiver (rack) is detached from the transmitter, whereby a power supplied to the transmitter is turned off.

On the other hand, if the operation point is searched before the driving frequency reaches f2, it is determined that the receiver (rack) is aligned, whereby energy (power) is transmitted continuously as far as a corresponding frequency difference is maintained.

In comparison with the fixed frequency driving method shown in FIG. 15, phase sensing shown in FIG. 16 has the following advantages.

First of all, it is technically advantageous that alignment or non-alignment of the receiver (rack) is sensed to reduce a standby power.

Secondly, it is technically advantageous that alignment or non-alignment of the foreign material is sensed to avoid the possibility of induction heating.

Thirdly, it is technically advantageous that a certain operation point may be maintained even though dispersion occurs in the components of the transmitter and the receiver.

Figure 17:
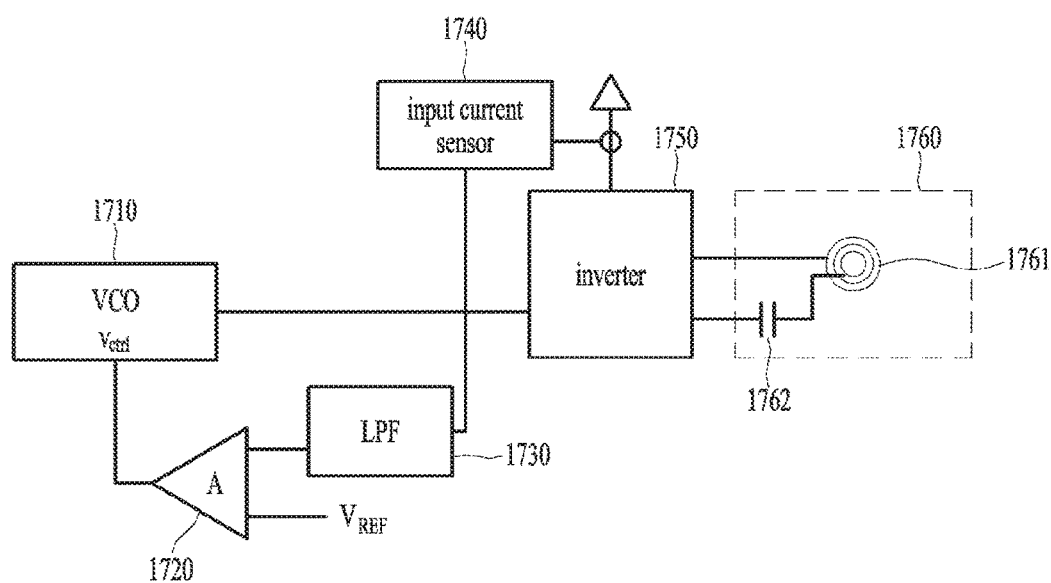
FIG. 17 illustrates other example of a structure of a transmitter shown in FIG. 10.

FIG. 17 illustrates other example of a structure of a transmitter shown in FIG. 10. Hereinafter, a principle for generating secondary resonance using a transmitter that senses an input power will be described with reference to FIG. 17.

As shown in FIG. 17, the transmitter (refrigerator main body) includes a voltage controller oscillator (VCO) 1710, an amplifier 1720, a low pass filter (LPF) 1730, an input current sensor 1740, an inverter 1750, and a resonator 1760. The resonator 1760 includes a coil 1761 and a capacitor 1762.

Power transfer is performed only when the receiver (rack) is aligned during operation at f2, which is secondary resonance frequency, and efficiency difference per load and distance is insensitive, whereby the transmitter may control the power if desired to control the power of the receiver.

FIG. 17 illustrates a power control method of the transmitter that uses the above properties. In comparison with the fixed frequency driving method shown in FIG. 15, an input current sensor 1740 for measuring a power, a low pass filter (LPF) 1730 for removing driving a frequency component from the input current because the driving frequency component is mixed in the input current, and a reference voltage and OPAMP 1720 for applying the filtered input current value to a specific value are added to the structure of the transmitter of FIG. 15.

A driving algorithm of the power control method shown in FIG. 17 is as follows.

The transmitter (refrigerator main body) starts to be driven at a frequency higher than f2, and searches for an operation point having a specific input current while lowering the frequency to reach f2.

If the operation point cannot be searched until the driving frequency reaches f2, it is determined that a foreign material (another metal not the rack) approaches to the transmitter or the receiver (rack) is detached from the transmitter, whereby a power supplied to the transmitter is turned off.

On the other hand, if the operation point is detected before the driving frequency reaches f2, it is determined that the receiver (rack) is aligned, whereby energy (power) is transmitted continuously as far as a corresponding frequency difference is maintained.

In comparison with the fixed frequency driving method shown in FIG. 15, the input power sensing method shown in FIG. 17 has the following advantages.

First of all, it is technically advantageous that alignment or non-alignment of the receiver (rack) is sensed to reduce a standby power.

Secondly, it is technically advantageous that alignment or non-alignment of the foreign material is sensed to avoid the possibility of induction heating.

Thirdly, it is technically advantageous that a certain operation point may be maintained even though dispersion occurs in the components of the transmitter and the receiver.

Fourthly, it is technically advantageous that a certain operation point may be maintained even though coupling between the coils of each of the transmitter (refrigerator main body) and the receiver (rack of the refrigerator) is changed (for example, distance change of the coil of the transmitter and the coil of the receiver).

Finally, stable load driving may be performed through constant power driving. For example, in case of the load such as LED, it is advantageous that a separate constant current driver is not required.

Figure 18:
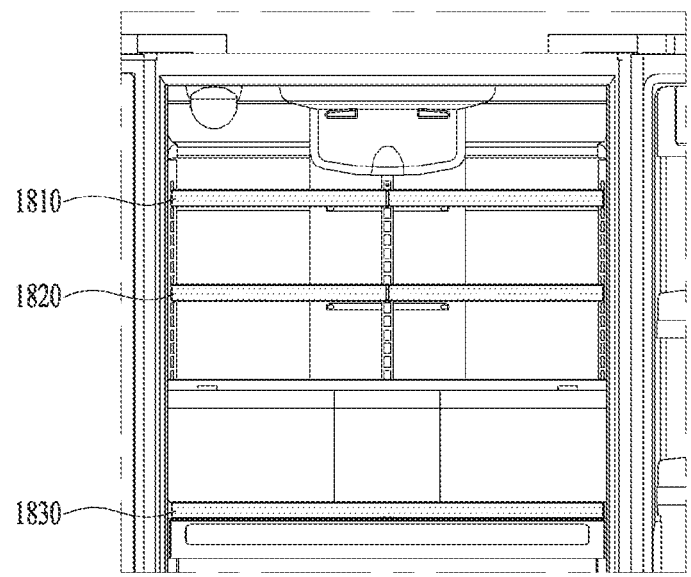
FIG. 18 illustrates an external appearance of refrigerator racks provided with a wireless power transmission system according to one embodiment of the present invention.

FIG. 18 illustrates an external appearance of refrigerator racks provided with a wireless power transmission system according to one embodiment of the present invention.

As described above, if a refrigerator is designed using the wireless power transmission system according to one embodiment of the present invention, LED may be configured on each of racks 1810, 1820 and 1830 which are detachably provided.

According to the related art, since a contact point type connector is used in case of LED installed on the rack which is detachably provided inside the refrigerator, there is a risk of aging and corrosion. However, according to one embodiment of the present invention, this problem may be solved.

The transmitter is provided on a wall inside the refrigerator, and a receiver is provided on each rack, whereby the transmitter transmits a power to the receiver. As a result, even though beverage cans of aluminum material or steel based pots instead of the rack are arranged, their induction heating may be avoided and the transmitter may be prevented from being damaged due to excessive resonance. As described above, according to one embodiment of the present invention, the problems such as induction heating or damage of the transmitter may be solved using the secondary resonance point.

In short again, the coil of the transmitter built in the main body of the refrigerator and the coil of the receiver built in the rack of the refrigerator have been manufactured as PCB coils, and MnZn based ferrite has been attached to the coils, whereby mutual inductance between the coils for transmission and reception has been increased.

Moreover, detailed options of the resonator of the transmitter are as follow. For example, coil inductance is about 9.3 µH, a serial capacitor is about 100 nF, and resonance frequency is about 150 kHz in the case that the transmitter exists independently.

Meanwhile, detailed options of the resonator of the receiver are as follow. For example, coil inductance is about 36 μH, a serial capacitor is about 4.7 nF, a parallel capacitor is about 2.2 nF, and secondary resonance frequency is about 350 kHz in case of coupling of the transmitter and the receiver. Of course, the secondary resonance frequency may be varied depending on a coupling state of the transmitter and the receiver, and is an experimental value when the transmitter and the receiver are aligned at an interval of 9 mm, approximately.

Finally, detailed options of the load of the receiver are as follows. For example, LED load has been used as a type of the load, and an equivalent load resistance is about 50Ω.

Meanwhile, as another embodiment of the present invention, the wireless power transmission system of the present invention may be designed such that light of different colors or brightness may be emitted to each rack. To this end, the amount of the power supplied to the refrigerator main body (transmitter) arranged at a side of each rack may be controlled differentially within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmission system using multiple coils, comprising:
   a transmitter; and
   a receiver,
   wherein the transmitter includes:
      a module for receiving a predetermined voltage, and
      a primary coil for generating a primary resonance frequency in accordance with the received voltage, and
   wherein the receiver, spaced apart from the transmitter, includes:
      a load for emitting light, capacitors connected in series or in parallel in accordance with an equivalent resistance of the load, and
      a secondary coil for generating a secondary resonance frequency greater than the primary resonance frequency, and
   wherein:
   the secondary coil and the capacitors are connected with each other in series if the equivalent resistance of the load is less than a predetermined first threshold value,
   the secondary coil and the capacitors are connected with each other in parallel if the equivalent resistance of the load exceeds a predetermined second threshold value, the second threshold value being greater than the first threshold value, and
   the capacitors are comprised of two capacitors and respectively connected with the secondary coil in series and in parallel if the equivalent resistance of the load is the predetermined first threshold value or more and the predetermined second threshold value or less.

2. The wireless power transmission system according to claim 1, wherein the secondary resonance frequency is twice or more than the primary resonance frequency.

3. The wireless power transmission system according to claim 1, wherein the module included in the transmitter includes an inverter for converting a DC power to an AC power and supplying the converted AC power to the primary coil.

4. The wireless power transmission system according to claim 3, wherein the module controls the inverter by using the secondary resonance frequency.

5. The wireless power transmission system according to claim 3, wherein the module starts to be driven at a frequency higher than the secondary resonance frequency, continuously receives the predetermined voltage if an operation point is detected while the frequency is lowered to reach the secondary resonance frequency, and stops reception of the predetermined voltage if the operation point is not detected while the frequency is lowered to reach the secondary resonance frequency.

6. The wireless power transmission system according to claim 5, wherein the operation point includes at least one of a case that a phase difference between a current applied to the primary coil and a frequency for driving the inverter corresponds to a specific phase difference and a case that a current applied to the inverter corresponds to a specific current value.

7. The wireless power transmission system according to claim 1, wherein the wireless power transmission system is included in a refrigerator, the receiver corresponds to a rack which is detachably provided inside the refrigerator, the transmitter is arranged at a side of the refrigerator spaced apart from the rack at a predetermined distance, and the load corresponds to a light emitting diode (LED).

8. The wireless power transmission system according to claim 7, wherein the module receives the predetermined voltage if opening of a door of the refrigerator is sensed, and stops reception of the predetermined voltage if closing of a door of the refrigerator is sensed.

9. The wireless power transmission system according to claim 1, wherein at least one of the primary coil and the secondary coil includes Mn—Zn based ferrite.

10. A wireless power transmission system using multiple coils, comprising:
   a transmitter; and
   a receiver,
   wherein the transmitter includes:
      a module for receiving a predetermined voltage, and
      a primary coil for generating a primary resonance frequency in accordance with the predetermined voltage received by the module,
   wherein the receiver, spaced apart from the transmitter, includes:
      a load for emitting light, capacitors connected in series or in parallel in accordance with an equivalent resistance of the load, and
      a secondary coil for generating a secondary resonance frequency greater than the primary resonance frequency, and
   wherein the secondary coil and the capacitors are connected with each other in series or parallel based on a value of the equivalent resistance of the load.

* * * * *